United States Patent
Kosonen et al.

(10) Patent No.: US 12,149,884 B2
(45) Date of Patent: Nov. 19, 2024

(54) AUDIO GENERATING ARRANGEMENT AND ELECTRONIC DEVICE COMPRISING SUCH ARRANGEMENT

(71) Applicant: Huawei Technologies Co., Ltd., Shenzhen (CN)

(72) Inventors: Matti Kosonen, Helsinki (FI); Ossi Maenpaa, Helsinki (FI)

(73) Assignee: Huawei Technologies Co., Ltd., Shenzhen (CN)

(*) Notice: Subject to any disclaimer, the term of this patent is extended or adjusted under 35 U.S.C. 154(b) by 147 days.

(21) Appl. No.: 17/802,040

(22) PCT Filed: Feb. 26, 2020

(86) PCT No.: PCT/EP2020/054963
§ 371 (c)(1),
(2) Date: Aug. 24, 2022

(87) PCT Pub. No.: WO2021/170224
PCT Pub. Date: Sep. 2, 2021

(65) Prior Publication Data
US 2023/0090109 A1    Mar. 23, 2023

(51) Int. Cl.
*H04R 1/28* (2006.01)
*G06F 1/16* (2006.01)
*H04R 1/02* (2006.01)

(52) U.S. Cl.
CPC ......... *H04R 1/2803* (2013.01); *G06F 1/1605* (2013.01); *G06F 1/1616* (2013.01); *G06F 1/1652* (2013.01); *H04R 1/02* (2013.01); *H04R 2499/11* (2013.01)

(58) Field of Classification Search
CPC .... H04R 1/2803; H04R 1/02; H04R 2499/11; G06F 1/1605; G06F 1/1616; G06F 1/1652
USPC ....................................................... 381/345
See application file for complete search history.

(56) References Cited

U.S. PATENT DOCUMENTS

| | | |
|---|---|---|
| 6,292,573 B1 | 9/2001 | Zurek et al. |
| 2010/0210327 A1 | 8/2010 | Kim |
| 2014/0241551 A1 | 8/2014 | Kim et al. |
| 2017/0052566 A1 | 2/2017 | Ka et al. |

*Primary Examiner* — Sean H Nguyen
(74) *Attorney, Agent, or Firm* — Slater Matsil, LLP

(57) ABSTRACT

An audio generating arrangement for an electronic device, the arrangement including at least one loudspeaker, a first body, and a second body at least partially enclosing the loudspeaker. At least one of the first body and the second body is moveable with respect to the other body. An acoustic cavity is formed by the loudspeaker and at least one of the first body and the second body. A volume of the acoustic cavity is configured to increase or decrease in response to movement of the first body or the second body. The arrangement in an electronic device enables increasing the volume of the acoustic cavity without also increasing the outer dimensions of the device.

16 Claims, 3 Drawing Sheets

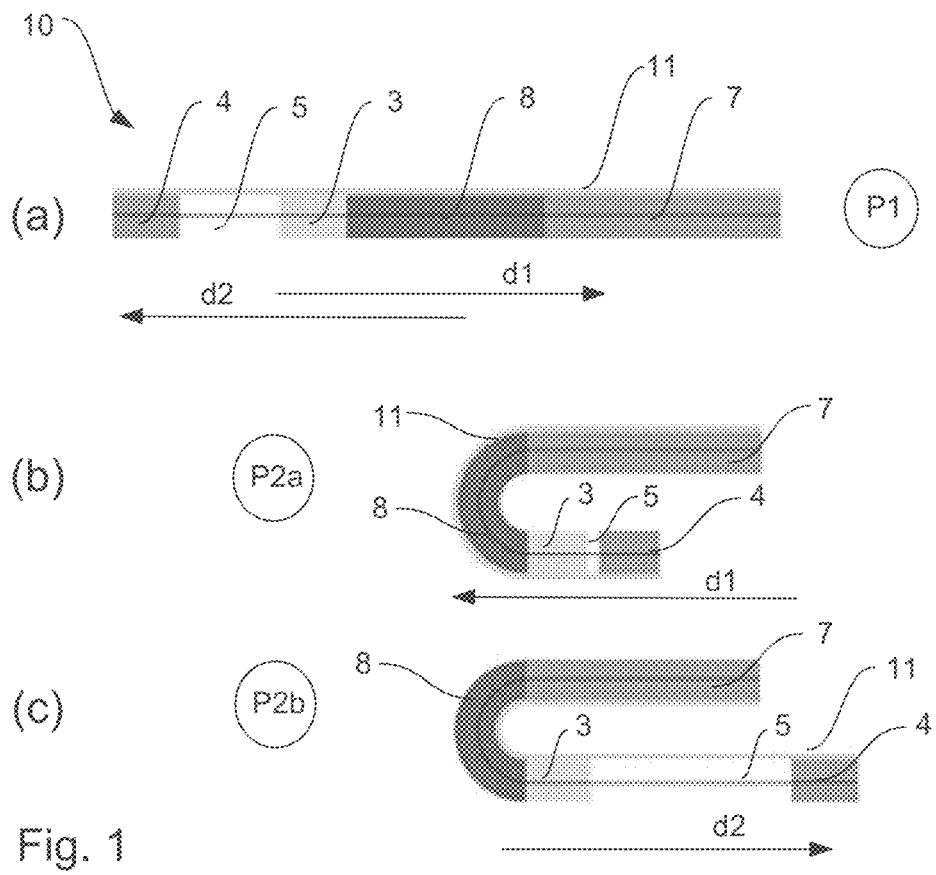
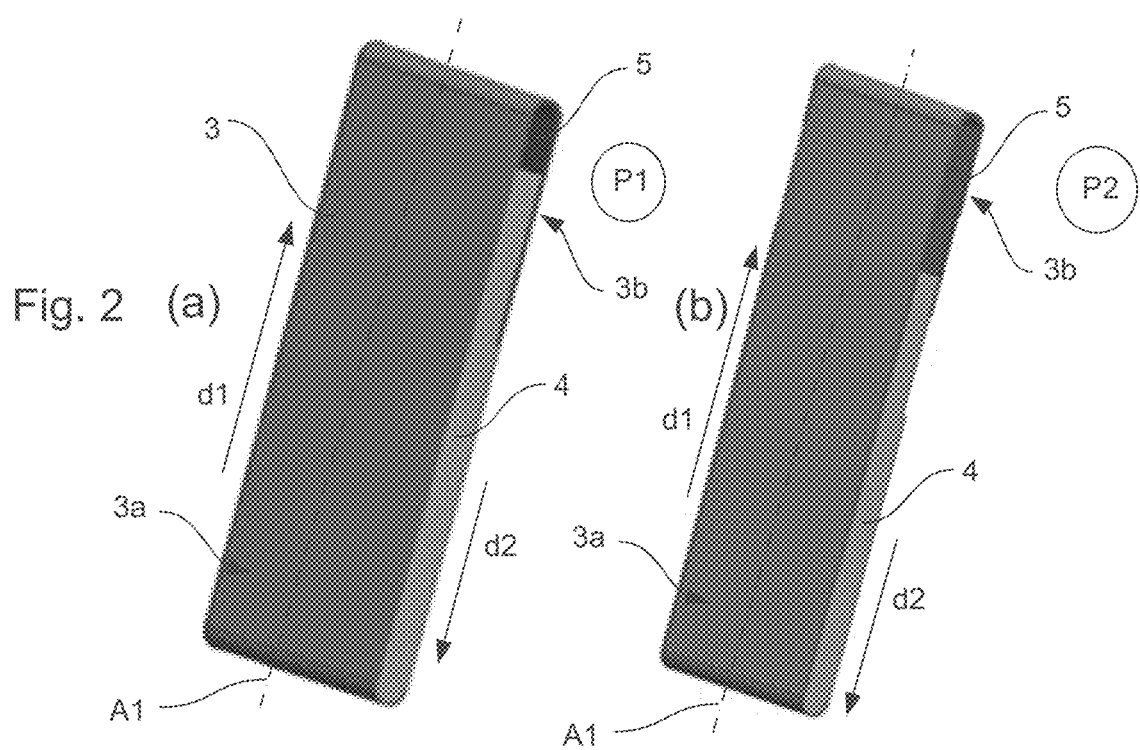
Fig. 1
Fig. 2

AUDIO GENERATING ARRANGEMENT AND ELECTRONIC DEVICE COMPRISING SUCH ARRANGEMENT

CROSS-REFERENCE TO RELATED APPLICATIONS

This application is a national stage of International Application No. PCT/EP2020/054963, filed on Feb. 26, 2020, which is hereby incorporated by reference in its entirety.

TECHNICAL FIELD

The disclosure relates to an audio generating arrangement, more particularly an audio generating arrangement for an electronic device.

BACKGROUND

As mobile electronic device technology develops, internal components such as loudspeakers become smaller and smaller in size. Although loudspeaker configuration can vary, a loudspeaker cannot produce high-quality audio or high sound pressure levels without connecting to a cavity of sufficiently sized volume. As the cavity becomes smaller, the loudness and clarity of the sound generated decreases.

The size of the cavity is limited by the inner and outer dimensions of the electronic device, which oftentimes cannot be increased. As a result, the size of the cavity, in such a mobile electronic device, has to be a compromise between available space and necessary space. Hence, the quality of sound in prior art electronic devices is determined by both the outer size of the device and the inner size of the cavity.

SUMMARY

It is an object to provide an improved audio generating arrangement. The foregoing and other objects are achieved by the features of the independent claims. Further implementation forms are apparent from the dependent claims, the description, and the figures.

According to a first aspect, there is provided an audio generating arrangement for an electronic device, the arrangement comprising at least one loudspeaker, a first body, and a second body at least partially enclosing the loudspeaker, at least one of the first body and the second body being moveable with respect to the other body, an acoustic cavity being formed by the loudspeaker and at least one of the first body and the second body, a volume of the acoustic cavity being configured to increase or decrease in response to movement of the first body or the second body.

This solution provides an arrangement that can be used in several different electronic devices without having any impact on the size of the device. When the first body and/or the second body moves, i.e. is rolled, folded, slid or bended into different positions, a volume change occurs inside the device. If this volume, inside the device, can be connected to the loudspeaker, the volume can function as an acoustic cavity for the loudspeaker. Thus, when the first body and/or the second body moves, the volume of the acoustic cavity changes simultaneously with the movement of the first body and/or the second body. This way, it is possible to use a larger loudspeaker and provide the user with better audio experience. Implementing the arrangement in an electronic device enables increasing the volume of the acoustic cavity without also increasing the outer dimensions of the device. A larger acoustic cavity volume results in improved audio quality, higher sound pressure levels, and lower frequencies. The arrangement has a simple configuration and structure, and can be produced at low cost since it functions without having to implement any additional elements into the device.

In a possible implementation form of the first aspect, the arrangement further comprises at least one functional element enclosed by the first body and the second body, the acoustic cavity being formed by the loudspeaker, at least one of the first body and the second body, and at least one of the functional elements. This facilitates designing the arrangement in accordance with the specific structure of an individual device, for example arranging the cavity next to a battery.

In a further possible implementation form of the first aspect, the first body or the second body is moveable along a sliding axis with respect to the other body, allowing the arrangement to be used in rollable, slidable, bendable, or foldable electronic devices.

In a further possible implementation form of the first aspect, the first body comprises a foldable display module comprising a first portion and a second portion, wherein movement of the first body causes sliding movement of the first portion of the foldable display module in a first direction along the sliding axis, and, simultaneously, sliding movement of the second portion of the foldable display module in a second direction along the sliding axis, the second direction being opposite to the first direction, the second portion being at least partially accommodated within the second body, the volume of the acoustic cavity increasing or decreasing in response to the movement of the second portion within the second body. This facilitates implementing the arrangement in devices having foldable or rollable displays, and allows using any sliding movement of the display module to the advantage of the loudspeaker and thus the sound quality.

In a further possible implementation form of the first aspect, the arrangement further comprises a third body, the third body being interconnected with the first body by means of a foldable hinge, the foldable hinge allowing the first body and the second body to be pivoted simultaneously with respect to the third body around a pivot axis, the pivot axis extending substantially perpendicular to the sliding axis, the second body sliding along the sliding axis in response to the pivoting movement. This facilitates a larger number of cavity sizes implemented at different stages of the pivoting movement, thus improving the audio in several stages. Moreover, this implementation form allows using the arrangement with a further types of electronic devices.

In a further possible implementation form of the first aspect, the audio generating arrangement is in an unfolded position when the first body, the second body, and the third body are aligned in a common plane comprising the sliding axis and the pivot axis, and the audio generating arrangement is in a first folded end position or, optionally, in a second folded end position when the first body and the second body are at least partially superimposed onto the third body. This facilitates implementing the arrangement in a foldable or bendable device, and allows having an increased acoustic cavity in multiple positions.

In a further possible implementation form of the first aspect, the second body slides in a first direction along the sliding axis when the audio generating arrangement is moved from the unfolded position towards the first folded end position, the first direction being towards the first body along the sliding axis, the volume of the acoustic cavity decreasing in response to the movement.

In a further possible implementation form of the first aspect, the second body slides in an opposite, second direction along the sliding axis when the audio generating arrangement is moved from the unfolded position towards the second folded end position, the second direction being away from the first body along the sliding axis, the volume of the acoustic cavity increasing in response to the movement. The increased acoustic cavity provides improved audio quality and higher sound pressure level.

In a further possible implementation form of the first aspect, an acoustic barrier is arranged between the first body and the third body, such that the acoustic cavity and the third body are acoustically sealed from each other. This improves the audio by avoiding echoing.

In a further possible implementation form of the first aspect, one of the second body and the third body comprises a microphone, the loudspeaker and the microphone being separated at least by the acoustic cavity. This prevents sound from the loudspeaker from being registered by the microphone.

According to a second aspect, there is provided an electronic device comprising a foldable display and the audio generating arrangement according to the above, the electronic device being configured to alter between at least two display positions. This solution provides a device in which the audio generating arrangement can be used regardless of the position of the display, the volume of acoustic cavity being increased and thus the audio quality being improved in at least some of those positions.

In a possible implementation form of the second aspect, the first body of the audio generating arrangement carries the foldable display, and the first body is slidably connected to the second body of the audio generating arrangement, the first body and the foldable display being moveable between a retracted display position and an extended display position, the volume of the acoustic cavity of the audio generating arrangement being the smallest in the retracted display position, and the volume of the acoustic cavity of the audio generating arrangement being the largest in the extended display position. As a result, the device can provide much improved audio quality in the extended display position.

In a further possible implementation form of the second aspect, the foldable display is fixedly connected to the second body and the third body of the audio generating arrangement, the foldable display and the audio generating arrangement being moveable between an unfolded position, a first folded end position, and, optionally, a second folded end position, the volume of the acoustic cavity of the audio generating arrangement being the smallest in the first folded end position, and the volume of the acoustic cavity of the audio generating arrangement being the largest in the second folded end position. This allows the acoustic cavity to have several different sizes, the loudspeaker functioning in all positions. The device provides better audio quality in the unfolded position than in the first folded end position, and provides even better audio quality in the second folded end position than in the unfolded position. As a result, the quality of the audio and the sound pressure level can be increased in stages.

In a further possible implementation form of the second aspect, the device further comprises an audio processing arrangement comprising a processor and a position detecting element, the processor being configured to adjust at least one audio processing parameter in response to the display position as detected by the position detecting element. This allows recognizing the display position, and acoustical hence cavity size, facilitating subsequent digital signal processing control and audio processing parameter adjustment according to position. Furthermore, accessing such position information does not increase manufacturing costs, since suitable sensors are already built into the electronic device for other reasons.

In a further possible implementation form of the second aspect, the audio processing parameters comprise at least one of audio frequency, gain level, quality, and dynamic range. This allows setting the necessary parameters for each position and with each cavity size, achieving the best possible audio.

In a further possible implementation form of the second aspect, the processor increases low audio frequencies and decreases gain level as the volume of the acoustic cavity decreases, and the processor decreases the low audio frequencies and increases the gain level as the volume of the acoustic cavity increases. This again allows achieving the best audio quality for each position. Moreover, it facilitates boosting the low frequencies when the acoustic cavity is small in order to compensate for the smaller volume size.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 1a shows a schematic illustration of an audio generating arrangement in accordance with one embodiment of the present invention, the arrangement being in an unfolded position;

FIG. 1b shows a schematic illustration of the audio generating arrangement shown in FIG. 1a, the arrangement being in a first folded end position;

FIG. 1c shows a schematic illustration of the audio generating arrangement shown in FIGS. 1a and 1b, the arrangement being in a second folded end position;

FIG. 2a shows a schematic perspective view of an audio generating arrangement in accordance with one embodiment of the present invention, the arrangement being in a retracted display position;

FIG. 2b shows a schematic perspective view of the audio generating arrangement shown in FIG. 2a, the arrangement being in an extended display position;

FIG. 4a shows a top view of an audio generating arrangement in accordance with one embodiment of the present invention, the arrangement being in an unfolded position;

FIG. 4b shows a side view of the audio generating arrangement shown in FIG. 4a;

FIG. 5a shows a top view of an audio generating arrangement in accordance with one embodiment of the present invention, the arrangement being in a first folded end position;

FIG. 5b shows a side view of the audio generating arrangement shown in FIG. 5a;

FIG. 6a shows a top view of an audio generating arrangement in accordance with one embodiment of the present invention, the arrangement being in a second folded end position;

FIG. 6b a side view of the audio generating arrangement shown in FIG. 6a.

DETAILED DESCRIPTION OF ILLUSTRATIVE EMBODIMENTS

Figure 3:
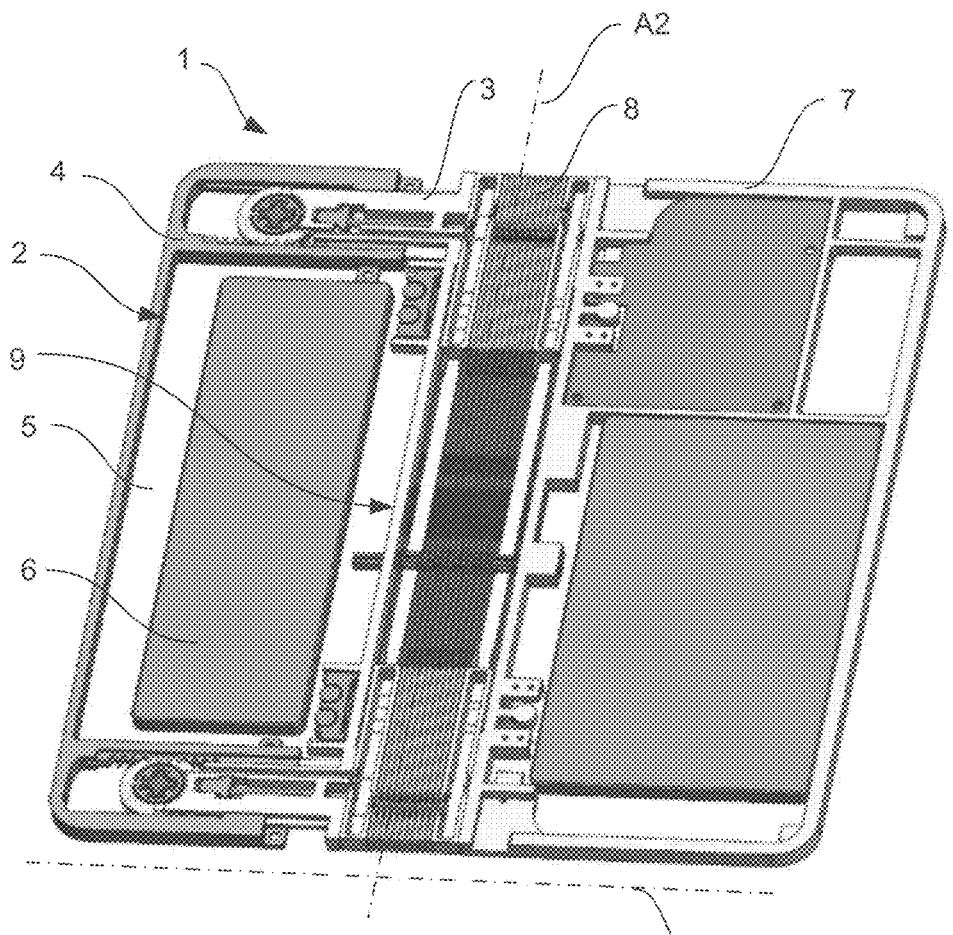
FIG. 3 shows a perspective view of a partial audio generating arrangement in accordance with one embodiment of the present invention.

FIG. 1 illustrates an electronic device 10 comprising a foldable display 11 and an audio generating arrangement 1. The electronic device 10 may be any type of portable electronic device, such as a mobile phone, tablet, laptop, loudspeaker, or other type of audio apparatus. The electronic device 10 may be able to change between at least two display positions P1, P2, P2a, P2b.

The audio generating arrangement 1 is shown in more detail in FIGS. 3-6b. The audio generating arrangement 1 preferably comprises at least one loudspeaker 2, a first body 3, and a second body 4. The second body 4 may at least partially enclose the loudspeaker 2. At least one of the first body 3 and the second body 4 are preferably moveable with respect to the other body 3, 4. An acoustic cavity 5 is formed by the loudspeaker 2 and at least one of the first body 3 and the second body 4. The volume of the acoustic cavity 5 is increased or decreased as one of the first body 3 or the second body 4 moves. The audio generating arrangement 1 will be described in more detail below.

In one embodiment, the first body 3 of the audio generating arrangement 1 carries the foldable display 11. The foldable display 11 has a flexible structure such that it might roll and/or bend. The first body 3 is preferably slidably connected to the second body 4 of the audio generating arrangement 1. As FIGS. 2a and 2b show, the first body 3 and the foldable display 11 are moveable between a retracted display position P1 and an extended display position P2. FIG. 2a illustrates that the volume of the acoustic cavity 5 of the audio generating arrangement 1 has its smallest size in the retracted display position P1. FIG. 2b depicts that the volume of the acoustic cavity 5 of the audio generating arrangement 1 has its largest size in the extended display position P2. Thus, the sound quality and the user experience are improved when the electronic device 10 is in the extended display position P2.

In the embodiments shown in FIGS. 1a-1c and 3-6b, the foldable display 11 is fixedly connected to the second body 4 and to a third body 7 of the audio generating arrangement 1. Similarly to the second body 4 the third body 7 may also be movable. If any of the second body 4 and the third body 7 moves, the flexible display 11 follows the movement and adapts its position and shape accordingly, i.e. slides, folds, rolls or bends. Simultaneously with these changes on the outside of the electronic device 10, the volume of the acoustic cavity 5 inside the electronic device 10 changes as well.

The first body 3, the second body 4, and the third body 7 may be frame sections forming a supporting and protecting structure for internal functional elements 6 such as battery, printed circuit boards, optics and so on. The bodies 3, 4, 7, in particular the second body 4 and the third body 7, may also form the peripheral side edges of the electronic device 10, the side edges extending between the display 11 and the back cover of the device 10.

Figures 4A, 4B:
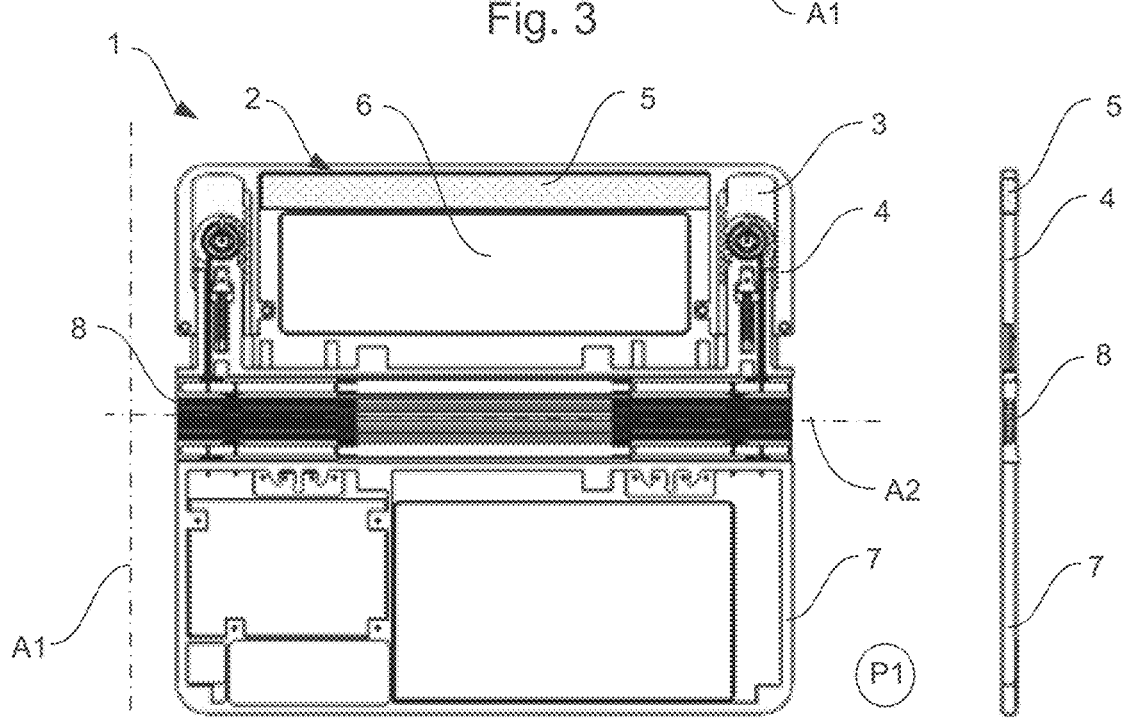
Figures 5A, 5B:
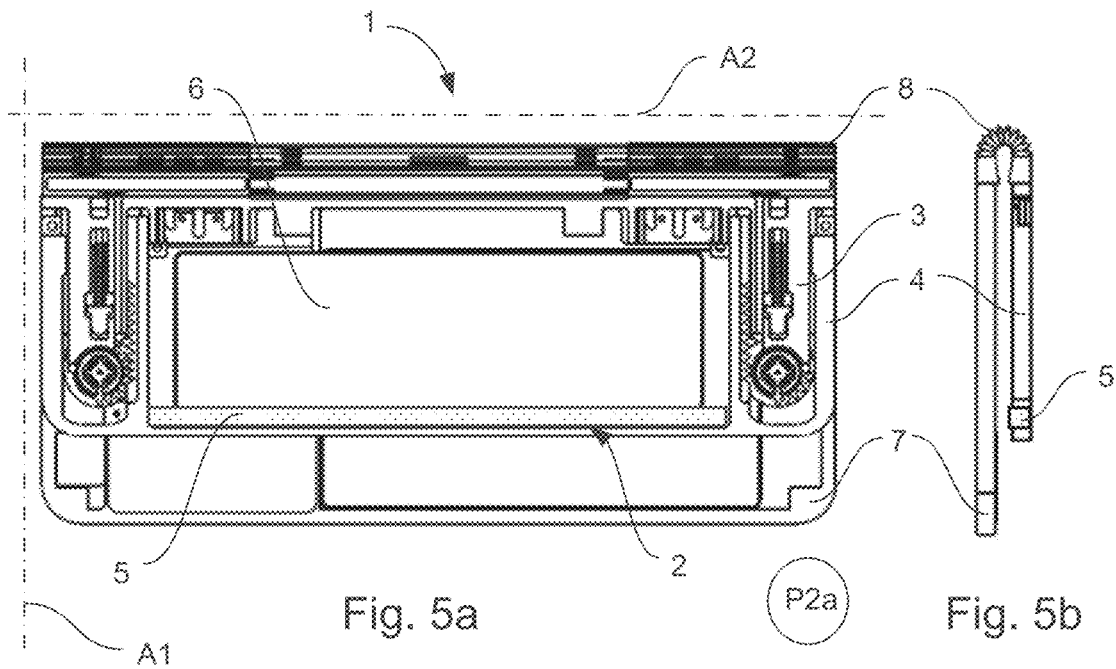
Figures 6A, 6B:
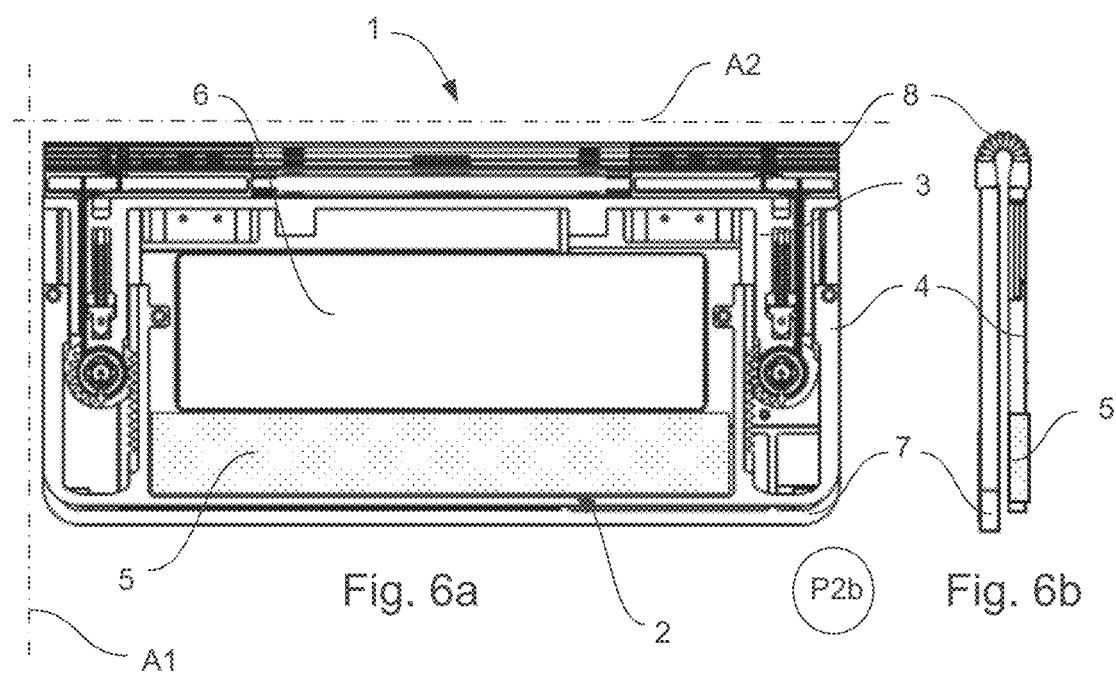

The foldable display 11 and the audio generating arrangement 1 may be moveable between an unfolded position P1, a first folded end position P2a, and, optionally, a second folded end position P2b. The unfolded position P1 is illustrated in FIGS. 1a, 4a, and 4b. The first folded end position P2a is illustrated in FIGS. 1b, 5a, and 5b. The second folded end position P2b is illustrated in FIGS. 1c, 6a, and 6b.

In one embodiment, the volume of the acoustic cavity 5 of the audio generating arrangement 1 is at its smallest when the electronic device 10 is in the first folded end position P2a, and is at its largest when the electronic device 10 is in the second folded end position P2b. The larger the volume of the acoustic cavity 5, the higher sound pressure level the loudspeaker 2 is able to produce.

The electronic device 10 may also comprise an audio processing arrangement. This audio processing arrangement can be equipped with a processor and a position detecting element in order to recognize the position of the device 10, i.e. whether the device is in the retracted display position P1, the extended display position P2, the unfolded position P1, the first folded end position P2a, or the second folded end position P2b. The position detecting element may be a hall-sensor. However, any type of position detecting element or elements may be used, such as elements already in the device, e.g. used for adjusting the display ratio.

When a particular position is recognized, the audio processing arrangement can control digital signal processing and adjust audio processing parameters accordingly. The processor may be configured to adjust at least one audio processing parameter in response to the display position P1, P2, P2a, P2b as detected by the position detecting element. These audio processing parameters preferably comprise at least one of audio frequency, gain level, quality, and dynamic range.

While making such adjustments, the processor may increase low audio frequencies and decrease gain level as the volume of the acoustic cavity 5 decreases. One reason for this is that a small acoustic cavity 5 may require compensation boosting low frequencies; furthermore, over-all gain cannot be set to its maximum value since the loudspeaker 2 can only handle a certain maximum voltage. When the size of the acoustical cavity 5 increases, low frequency boost is not needed and over-all gain can be set to higher level to maximize the sound pressure level. Hence, the processor is able to decrease the low audio frequencies and increase the gain level as the volume of the acoustic cavity 5 increases.

As FIGS. 3-6 show, the audio generating arrangement 1 may comprise at least one functional element 6, such as a battery. The functional element 6 may be enclosed by the first body 3 and the second body 4. The acoustic cavity 5 may be formed by the loudspeaker 3, at least one of the first body 3 and the second body 4, and at least one of the functional elements 6.

The first body 3 or the second body 4 may be moveable along a sliding axis A1 with respect to the other body 4, 3, as shown in FIGS. 2a and 2b.

The first body 3 may comprise a foldable display module, which comprises a first portion 3a and a second portion 3b. When the first body 3 moves, it causes a sliding movement of the first portion 3a in a first direction d1, and simultaneously a sliding movement of the second portion 3b in a second direction d2. Both sliding movements occur along the sliding axis A1. The second direction d2 is opposite to the first direction d1, as FIGS. 2a and 2b also depict. The second portion 3b can be at least partially accommodated within the second body 4. In response to the movement of the second portion 3b within the second body 4, the volume of the acoustic cavity 5 increases or decreases.

As mentioned above, the audio generating arrangement 1 may further comprise a third body 7. The third body 7 can be interconnected with the first body 3 by means of a foldable hinge 8, which allows the first body 3 and the second body 4 to be pivoted simultaneously with respect to the third body 7. This pivoting movement occurs around a pivot axis A2, as illustrated in FIGS. 3-6. The pivot axis A2 extends substantially perpendicular to the sliding axis A1. The second body 4 can slide along the sliding axis A1 in response to the pivoting movement. This sliding movement of the second body 4 can be assisted and supported by some additional elements, such as wheels, gears and/or rails mounted in the electronic device 10. As the second body 4 slides, the volume of the acoustic cavity 5 increases or decreases.

As described earlier, the audio generating arrangement 1 and/or the electronic device 10 can be in an unfolded position P1. This position might be used for example when the device is in tablet mode. In the unfolded position P1, the first body 3, the second body 4, and the third body 7 are aligned in a common plane. This common plane also comprises the sliding axis A1 and the pivot axis A2. The audio generating arrangement 1 can also be in a first folded end position P2a or, optionally, in a second folded end position P2b. In these positions, the first body 3 and the second body 4 are at least partially superimposed onto the third body 7, thereby making the foldable display 11 bend.

The second body 4 slides in a first direction d1 along the sliding axis A1 when the audio generating arrangement 1 is moved from the unfolded position P1 towards the first folded end position P2a. The first direction d1 is towards the first body 3 along the sliding axis A1. In response to the second body 4 sliding in the first direction d1, the volume of the acoustic cavity 5 decreases. This is illustrated in FIG. 1b. The loudspeaker 2 can also function when the volume of the acoustic cavity 5 is decreased. Furthermore, some compensation steps can take place in order to improve the sound quality when the volume of the acoustic cavity 5 is smaller. One compensation might be the increasing of the low audio frequencies.

As shown in FIG. 1c, the second body 4 slides in an opposite, second direction d2 along the sliding axis A1 when the audio generating arrangement 1 moves from the unfolded position P1 towards the second folded end position P2b. The second direction d2 is away from the first body 3 along the sliding axis A1. In response to the second body 4 sliding in the second direction d2, the volume of the acoustic cavity 5 increases. This position provides an improved loudspeaker 2 for the electronic device 10, since a loudspeaker connected to a larger cavity can generate higher sound pressure levels and, thus, provide a better user experience.

In order to avoid or decrease echoing between the first body 3 and the third body 7, an acoustic barrier 9 can be provided such that the acoustic cavity 5 and the third body 7 are acoustically sealed from each other.

One of the second body 4 and the third body 7 may comprise a microphone, which is preferably separated from the loudspeaker 2 at least by the acoustic cavity 5. Separating the microphone and the loudspeaker 2 from each other prevents audio generated by the loudspeaker from being registered by the microphone.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. An electronic device comprising:
   at least one loudspeaker;
   a battery;
   a first body; and
   a second body at least partially enclosing said loudspeaker and said battery;
   wherein at least one of the first body and the second body is moveable with respect to the other body;
   wherein an acoustic cavity is formed by said loudspeaker and at least one of said first body and said second body; and
   wherein a volume of the acoustic cavity is configured to increase or decrease in response to movement of said first body or said second body.

2. The electronic device according to claim 1, comprising at least one functional element enclosed by said first body and said second body, wherein said acoustical cavity is further formed by said at least one of said functional elements.

3. The electronic device according to claim 1, wherein said first body or said second body is moveable along a sliding axis with respect to the other body.

4. The electronic device according to claim 1, wherein said first body comprises a foldable display module comprising a first portion and a second portion;
   wherein movement of said first body causes sliding movement of the first portion of said foldable display module in a first direction along a sliding axis, and, simultaneously, sliding movement of the second portion of said foldable display module in a second direction along said sliding axis, the second direction being opposite to the first direction; and
   wherein said second portion is at least partially accommodated within said second body, and wherein said volume of said acoustic cavity increases or decreases in response to the movement of said second portion within said second body.

5. The electronic device according to claim 1, further comprising a third body, wherein said third body is interconnected with said first body by a foldable hinge, wherein said foldable hinge allows said first body and said second body to be pivoted, simultaneously, with respect to said third body, around a pivot axis, wherein said pivot axis extends substantially perpendicular to a sliding axis, and wherein said second body slides along said sliding axis in response to said pivoting movement.

6. The electronic device according to claim 5, wherein said electronic device is in an unfolded position when said first body, said second body, and said third body are aligned in a common plane comprising said sliding axis and said pivot axis, and wherein said electronic device is in a first folded end position or, in a second folded end position when said first body and said second body are at least partially superimposed onto said third body.

7. The electronic device according to claim 6, wherein said second body slides in a first direction along said sliding axis when said second body is moved from the unfolded position towards said first folded end position, said first direction being towards said first body along said sliding axis, and said volume of said acoustic cavity decreases in response to said movement in said first direction.

8. The electronic device according to claim 6, wherein said second body slides in a second direction, opposite said first direction, along said sliding axis when said second body is moved from the unfolded position towards said second folded end position, said second direction being away from said first body along said sliding axis, and said volume of said acoustic cavity increases in response to said movement in said second direction.

9. The electronic device according to claim 5, wherein further comprising an acoustic barrier between said first body and said third body, such that said acoustic cavity and said third body are acoustically sealed from each other.

10. The electronic device according to claim 5, wherein one of said second body and said third body comprises a microphone, and wherein said loudspeaker and said microphone are separated by at least said acoustic cavity.

11. An electronic device configured to alter between at least two display positions comprising:
   a foldable display;
   at least one loudspeaker;
   a first body; and
   a second body at least partially enclosing said loudspeaker;
   wherein at least one of the first body and the second body is moveable with respect to the other body;
   wherein an acoustic cavity is formed by said loudspeaker and at least one of said first body and said second body; and
   wherein a volume of the acoustic cavity is configured to increase or decrease in response to movement of said first body or said second body.

12. The electronic device according to claim 11, wherein the first body comprises the foldable display, and the first body is slidably connected to the second body; and
   wherein said first body and said foldable display are moveable between a retracted display position and an extended display position, wherein a volume of the acoustic cavity is the smallest in said retracted display position, and wherein the volume of the acoustic cavity is the largest in said extended display position.

13. The electronic device according to claim 11, wherein the foldable display is fixedly connected to the second body and a third body, wherein said foldable display, said second body, and said third body are moveable between an unfolded position, a first folded end position, and a second folded end position;
   wherein the volume of the acoustic cavity is the smallest in said first folded end position; and
   wherein the volume of the acoustic cavity is the largest in said second folded end position.

14. The electronic device according to claim 12, further comprising a processor and a position detecting element, wherein said processor is configured to adjust at least one audio processing parameter in response to a display position as detected by said position detecting element.

15. The electronic device according to claim 14, wherein said audio processing parameters comprise at least one of an audio frequency, a gain level, a quality, and a dynamic range.

16. The electronic device according to claim 15, wherein said processor increases low audio frequencies and decreases gain level as said volume of said acoustic cavity decreases, and wherein said processor decreases said low audio frequencies and increases said gain level as said volume of said acoustic cavity increases.

* * * * *